US012718367B2

(12) United States Patent
Grimm et al.

(10) Patent No.: US 12,718,367 B2
(45) Date of Patent: Aug. 25, 2026

(54) CLASSIFICATION OF DYNAMICALLY CONTRAST-ENHANCED MEDICAL IMAGE DATA OF A LIVER

(71) Applicant: Siemens Healthineers AG, Forchheim (DE)

(72) Inventors: Robert Grimm, Nuremberg (DE); Cornelius Jacob, Erlangen (DE)

(73) Assignee: Siemens Healthineers AG, Forchheim (DE)

(*) Notice: Subject to any disclaimer, the term of this patent is extended or adjusted under 35 U.S.C. 154(b) by 276 days.

(21) Appl. No.: 18/661,775

(22) Filed: May 13, 2024

(65) Prior Publication Data

US 2024/0386550 A1 Nov. 21, 2024

(30) Foreign Application Priority Data

May 15, 2023 (DE) ..................... 10 2023 204 518.4

(51) Int. Cl.
*G06T 7/00* (2017.01)

(52) U.S. Cl.
CPC .. *G06T 7/0012* (2013.01); *G06T 2207/10081* (2013.01); *G06T 2207/10088* (2013.01); *G06T 2207/20081* (2013.01); *G06T 2207/20084* (2013.01); *G06T 2207/30056* (2013.01)

(58) Field of Classification Search
CPC ......... G06T 7/0012; G06T 2207/10081; G06T 2207/10088; G06T 2207/20081; G06T 2207/20084
See application file for complete search history.

(56) References Cited

U.S. PATENT DOCUMENTS

| | | | | |
|---|---|---|---|---|
| 10,610,302 | B2 * | 4/2020 | Comaniciu | A61B 34/10 |
| 11,398,026 | B2 * | 7/2022 | Hooper | G06F 18/2413 |
| 11,587,236 | B2 * | 2/2023 | Palma | A61B 6/5217 |
| 11,748,878 | B2 * | 9/2023 | Grimm | G06T 7/0012 |
| 2006/0210479 | A1 * | 9/2006 | Young | A61K 49/005 540/465 |
| 2015/0196281 | A1 * | 7/2015 | Takagi | A61B 8/06 600/408 |
| 2015/0226815 | A1 | 8/2015 | Block et al. | |
| 2021/0056684 | A1 * | 2/2021 | Zhou | G06V 10/82 |
| 2021/0113190 | A1 | 4/2021 | Errico et al. | |
| 2021/0196384 | A1 * | 7/2021 | Shelton, IV | A61B 1/0646 |
| 2021/0366114 | A1 * | 11/2021 | Min | A61B 6/481 |
| 2022/0012927 | A1 * | 1/2022 | Sitek | A61B 6/5217 |
| 2022/0318567 | A1 * | 10/2022 | Muhamedrahimov | G06F 18/23 |

(Continued)

OTHER PUBLICATIONS

Ma, et al.: "Automated Identification of Optimal Portal Venous Phase Timing with Convolutional Neural Networks", Acad Radiol Feb. 2020; 27(2) e10-e18.

(Continued)

*Primary Examiner* — Mohammed H Zuberi
(74) *Attorney, Agent, or Firm* — Banner & Witcoff, Ltd.

(57) ABSTRACT

A method for classifying medical image data using a classification algorithm configured to make an image-based correlation between an image data set and a phase of a plurality of defined phases relative to a time of administration of a contrast agent with additional plausibility checking. The image data may include at least three image data sets in each case imaging the examination region in each case at a time of capture within a period of less than two hours.

16 Claims, 4 Drawing Sheets

(56) References Cited

U.S. PATENT DOCUMENTS

| | | | | |
|---|---|---|---|---|
| 2023/0237647 | A1 | 7/2023 | Xu et al. | |
| 2024/0087118 | A1* | 3/2024 | Li | G06V 10/44 |
| 2025/0166186 | A1* | 5/2025 | Golden | G06T 7/0012 |

OTHER PUBLICATIONS

Grimm, R et al: “Automatic Bolus Analysis for DCE-MRI Using Radial Golden-Angle Stack-of-stars GRE Imaging”, Proc. ISMRM 2013, #6523.

Feng L et al.: “GRASP-Pro: Improving GRASP DCE-MRI Through Self-Calibrating Subspace-Modeling and Contrast Phase Automation”, MRM Jan. 2020; 83(1) 94-108.

* cited by examiner

CLASSIFICATION OF DYNAMICALLY CONTRAST-ENHANCED MEDICAL IMAGE DATA OF A LIVER

CROSS REFERENCE TO RELATED APPLICATIONS

This patent application claims priority to German Patent Application No. 10 2023 204 518.4, filed May 15, 2023, which is incorporated herein by reference in its entirety.

BACKGROUND

Field

The disclosure relates to a method, to a classification system, a computer program product and an electronically readable data storage medium for classifying medical image data.

Related Art

Dynamic contrast enhancement methods are typically used in the course of diagnostic medical imaging of the liver. A contrast agent is here typically administered to the object under examination, i.e., the patient to be examined, and the spatial propagation, in particular perfusion, of the contrast agent within the patient's body, in particular within the liver, is monitored. Medical image data sets are typically captured, each of which images the liver at different times of capture. Depending on the time of capture of the medical image data sets relative to the time of administration of the contrast agent, the medical image data sets can be assigned to different phases. A radiologist, for example, can then analyze the medical image data sets with regard to an anomaly with an awareness of the corresponding phases. Correctly assigning the phases is in particular vital for the detection and differential diagnosis of focal liver lesions. Image processing algorithms, in particular for segmentation, also require information about phase and, relatedly, contrast. Correct classification of the medical image data sets with regard to the phase of contrast agent perfusion is consequently of particular relevance to arriving at a diagnosis.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
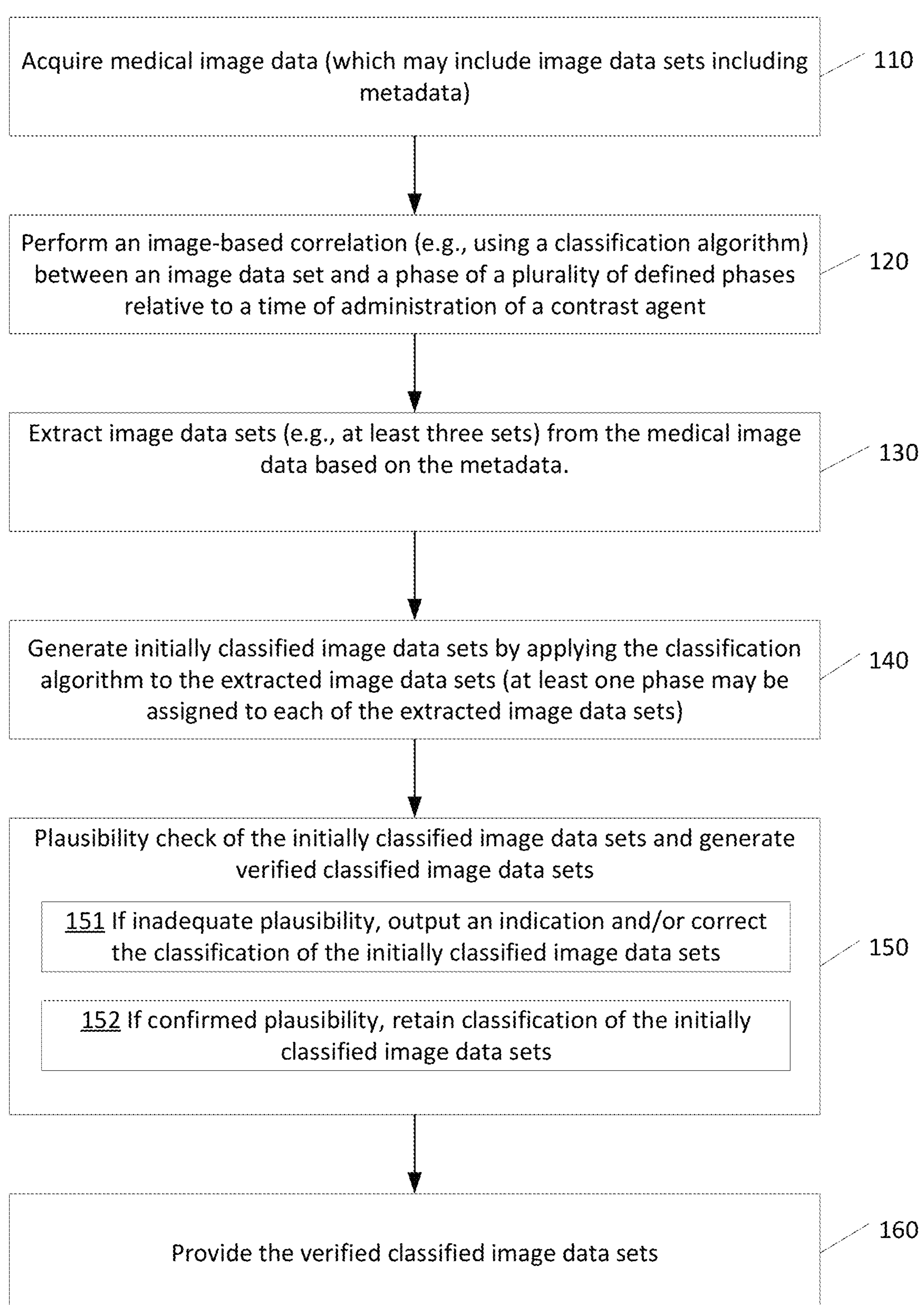
FIG. 1 is a flowchart of a method according to the disclosure.

The exemplary embodiments of the present disclosure will be described with reference to the accompanying drawings. Elements, features and components that are identical, functionally identical and have the same effect are—insofar as is not stated otherwise-respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to provide a particularly robust and accurate method for classifying medical image data of the liver with regard to perfusion phases.

The method according to the disclosure for classifying medical image data may include:

- acquiring medical image data of an examination region, which examination region comprises a liver of an object under examination, which medical image data comprises at least three image data sets, each of which images the examination region in each case at a time of capture within a period of less than two hours,
- wherein each of the at least three image data sets in each case comprises metadata with regard to at least one capture parameter and the time of capture,
- providing a classification algorithm configured to make an image-based correlation between an image data set and a phase of a plurality of defined phases relative to a time of administration of a contrast agent,
- extracting at least three image data sets from the medical image data on the basis of the metadata,
- generating initially classified image data sets by applying the classification algorithm to the at least three extracted image data sets, wherein at least one phase is assigned to each of the three extracted image data sets,
- generating verified classified image data sets by checking the plausibility of the initially classified image data sets taking account of at least one of the following characteristics:
  - order of the assigned phases,
  - order of the times of capture,
  - relative time lag of the times of capture of the initially classified image data sets,
  - number of the at least three image data sets,
  - number of mutually differing assigned phases,
  - medical image data metadata, comprising output of an indication and/or correction of the classification of the initially classified image data sets in the event of inadequate plausibility and retention of the classification of the initially classified image data sets in the event of confirmed plausibility,
- providing the verified classified image data sets.

Medical image data is two-dimensional image data sets or three-dimensional volume data sets imaging an examination region of objects under examination which have been generated with image-forming apparatuses, in particular medical imaging devices, such as for example magnetic resonance devices or computed tomography devices.

In such medical image data, each pixel and/or voxel has a value which can be encoded as a grayscale value or as a color value, for example as a two-dimensional slice which is located in a three-dimensional volume data set. The pixel and/or voxel typically represents a signal intensity of a morphological and/or functional image. The image data sets typically additionally comprise metadata comprising information about capture parameters and/or times of capture. The examination region is typically a subregion of the object under examination.

The time of capture of an image data set typically comprises a time and/or a time stamp and/or a time of day which temporally characterizes a time of acquisition, in particular of capture, of the corresponding image data set. The time of capture may also comprise a duration and/or a period. The time of capture may characterize the beginning and/or temporal middle and/or the end of acquisition of the corresponding image data set.

The medical image data of the examination region is preferably characterized in that it has been acquired within an examination, in particular within a period during which the object under examination was continuously positioned relative to the medical imaging device in such a way that acquisition of the medical image data and/or administration of contrast agent to the object under examination is possible. The medical image data of the examination region, in particular the at least three image data sets, has typically been captured within a period of less than two hours, preferably of less than one hour and particularly preferably of less than 45 minutes. During acquisition of the medical image data and/or within the period, a contrast agent is typically administered to the object under examination. The contrast agent may at least in part be administered during acquisition of at least one image data set of the at least three image data sets. The contrast agent may at least in part be administered between the acquisition of two temporally successive image data sets of the at least three image data sets.

Acquiring medical image data may comprise acquisition of the medical image data by way of a medical imaging device. Acquiring medical image data may comprise providing the medical image data, the medical image data in particular being provided to the classification system via a first interface.

Extracting at least three image data sets from the medical image data on the basis of the metadata preferably comprises selecting the at least three image data sets. The metadata may for example comprise a DICOM label.

The classification algorithm may be configured to assign one phase of a plurality of defined phases to at least one image data set of the at least three image data sets. The classification algorithm can take the metadata into account. The classification algorithm preferably functions without taking metadata into account and/or in purely image-based manner. In particular, the classification algorithm may be configured to analyze the spatial distribution of the grayscale values assigned to signal intensity and/or voxels, on the basis of which analysis one phase of a plurality of defined phases relative to a time of administration of a contrast agent to the object under examination is assigned. The classification algorithm may be configured to assign precisely one phase of the plurality of defined phases to each image data set of the at least three image data sets. The same phase of the plurality of defined phases may here also be assigned to at least two image data sets of the at least three image data sets. Different phases of the plurality of defined phases may be assigned to each image data set of the at least three image data sets. The plurality of defined phases comprises temporal phases and/or times and/or time intervals relative to a time of administration of a contrast agent to an object under examination, in particular to the object under examination. The plurality of defined phases are typically independent of the individual object under examination and/or generally applicable and/or standardized. The plurality of defined phases are preferably perfusion phases defining a perfusion and/or propagation of the contrast agent within the examination region comprising the liver and/or in the region surrounding the liver and/or within the liver.

The initially classified image data sets are preferably plausibility checked taking account of a plurality of characteristics of the initially classified image data sets. In particular, plausibility checking may take place taking account of the metadata and the assigned phases and/or comprise a comparison of these among themselves, in particular also with regard to logical order. The metadata may also comprise a conventional protocol, in particular also individual to the institution, for acquisition of the medical image data in the course of perfusion imaging of the liver. The plausibility check typically comprises a rule-based method for resolving conflicts of the assigned phases and for ensuring a logical order of the assigned phases. A lack of plausibility typically occurs when at least one rule is not observed and/or characteristics are inconsistent. The plausibility check can separately verify the initially classified image data sets. The plausibility check can verify the initially classified image data sets together and/or simultaneously, in particular also with regard to individual or all the assigned phases of the plurality of defined phases.

The verified classified image data sets are preferably provided via a second interface. Provision of the verified classified image data sets may comprise saving the verified classified image data sets.

The method according to the disclosure enables image-based classification by way of a classification algorithm in combination with a plausibility check with regard to empirical rules, it being possible to take account of all the medical image data of an object under examination. This enables improved and robust determination and assignment of the perfusion phases. Initial classification typically takes place by applying the classification algorithm to the at least three extracted image data sets, i.e., by correlating and/or assigning each extracted image data set with/to a phase. At most one phase of the plurality of defined phases may be assigned to each extracted image data set. An illogical initial classification can be identified and corrected and/or be output with an indication to a user. In particular, the method according to the disclosure may take place automatically taking account of individual specifications during plausibility checking, such that the accuracy and plausibility of the final classification, i.e., of the verified classified image data sets, can be ensured. In addition, the method is independent of specific capture parameters, in particular thanks to the use of an image-based classification algorithm, such that it can be put to versatile use. In particular, there is no need for a specific capture protocol for the medical image data.

One embodiment of the method provides that the medical image data comprises CT data, in particular CT data with dynamic contrast enhancement. CT data is typically medical image data acquired by way of a computed tomography. Such medical image data can portray the abdomen of an object under examination, in particular the liver, particularly well, in particular three-dimensionally. The perfusion of a contrast agent in this region after administration of contrast agent can be particularly well portrayed by way of such medical image data. As a consequence, such medical image data can be classified particularly well by way of the method.

One embodiment of the method provides that the medical image data comprises MR data, in particular MR data with dynamic contrast enhancement. MR data is typically medical image data acquired by way of a magnetic resonance device. Such medical image data can portray the abdomen of an object under examination, in particular the liver, particularly well, in particular three-dimensionally. The perfusion of a contrast agent in this region after administration of contrast agent can be particularly well portrayed with the assistance of such medical image data. During contrast agent administration, the spatial distribution of the contrast agent changes dynamically such that the contrast of the image data sets is dependent on the time of capture of the corresponding image data set relative to contrast agent administration and changes continuously. As a consequence, such medical image data can be classified particularly well with the assistance of the method, in particular due to the use of the image-based classification algorithm.

One embodiment of the method provides that the capture parameter comprises at least one of the following values: echo time, repetition time, MR control sequence, or contrast. Such capture parameters are decisive for the contrast of the at least three image data sets. The capture parameters of the at least three image data sets may differ from one another. The capture parameters of the at least three image data sets are preferably identical. The at least three image data sets typically differ in their time of capture, preferably only in their time of capture. The at least three image data sets were preferably acquired with identical capture parameters. Such an embodiment enables particularly simple extraction of at least three image data sets from the medical image data on the basis of the metadata. Image data sets may for example be acquired with specific MR control sequences and/or be selected with specific contrasts in the course of extraction of at least three image data sets such that the classification algorithm only has to be applied to preselected image data sets. This allows the method to be carried out particularly efficiently.

One embodiment of the method provides that, on extraction of the at least three image data sets, selecting image data sets having a T1 contrast. Image data sets having a T1 contrast enable a particularly clear portrayal of the perfusion of a contrast agent administered to an object under examination. If those image data sets of the medical image which are particularly suitable for image-based classification by way of a classification algorithm are already selected and/or preselected on extraction of the at least three image data sets, it is possible to ensure particularly accurate and robust classification.

One embodiment of the method provides that the plurality of defined phases comprises at least three of the following phases:

- native phase comprising a first period prior to administration of a contrast agent,
- arterial phase comprising a second period beginning between 20 seconds and 40 seconds, preferably between 25 seconds and 35 seconds, and particularly preferably 30 seconds after administration of the contrast agent,
- portal venous phase comprising a third period beginning between 75 seconds and 105 seconds, preferably between 85 seconds and 95 seconds, and particularly preferably 90 seconds after administration of the contrast agent,
- equilibrium phase comprising a fourth period beginning between 2.5 minutes and 3.5 minutes, preferably 3 minutes after administration of the contrast agent,
- hepatobiliary phase comprising a fifth period beginning between 17 minutes and 23 minutes, preferably between 19 minutes and 21 minutes, and particularly preferably 20 minutes after administration of the contrast agent.

The plurality of defined phases are known as dynamic perfusion phases and enable a comprehensive liver diagnosis on assignment of the corresponding image data sets. The verified classified image data sets preferably comprise at least five image data sets, wherein, in the course of classification, at least one of the at least five image data sets is assigned to each of the above-stated five defined phases. The verified classified image data sets preferably comprise at least five image data sets, wherein, in the course of classification, five different phases are assigned to the verified classified image data sets. Such verified classified image data sets enable particularly good diagnosis of liver disease.

One embodiment of the method provides that the at least three image data sets are extracted by applying a trained function and/or a neural network. According to this embodiment, the neural network and/or trained function has preferably been pretrained, in particular with the assistance of a plurality of medical image data comprising image data sets with metadata and/or indications with regard to their usability for liver diagnostics. This embodiment enables particularly good extraction of relevant image data sets from the medical image data onto which relevant image data sets the classification algorithm is to be applied. Particularly accurate classification can be ensured in this manner.

One embodiment of the method provides that the classification algorithm comprises an algorithm for identifying landmarks. Image-based classification on the basis of landmarks can be put to particularly flexible and robust use.

One embodiment of the method provides that the classification algorithm comprises a trained function, in particular a neural network and/or an architecture configured for machine learning. The architecture configured for machine learning preferably comprises a deep learning-based autoencoder. According to this embodiment, the neural network and/or trained function and/or architecture configured for machine learning has preferably been pretrained, in particular with the assistance of a plurality of medical image data comprising image data sets, each with an assigned phase of the plurality of defined phases. In particular neural networks, in particular U-Nets, are particularly effective in the course of image processing and are capable of carrying out a particularly good classification on the basis of image features relating to perfusion phases.

One embodiment of the method provides that the classification algorithm comprises a regression model. According to this embodiment, the classification algorithm may be configured for regression. In the event of a lack of clarity with regard to assignment of a phase of the plurality of defined phases, the classification algorithm may for example be configured to carry out a regression with regard to the relevant phases and/or assign the relevant phases and/or offer the relevant phases to a user for selection. This enables particularly comprehensive and at the same time automated classification.

One embodiment of the method provides that the plausibility check comprises at least one of the following comparisons:

comparison of the assigned phases with a relative time lag of the times of capture of the initially classified image data sets, comparison of an order of the assigned phases with an order of the times of capture of the initially classified image data sets and/or with a defined order of the plurality of defined phases, comparison of the number of the at least three image data sets with the number of mutually differing assigned phases.

One embodiment of the method provides that the generation of verified classified image data sets comprises a further application of the classification algorithm once the plausibility check is complete. According to this embodiment, the classification algorithm may be consequently applied to the verified classified image data sets. A further plausibility check may then optionally be carried out. This enables a particularly accurate classification.

It is also conceivable for the plausibility check to be applied to the extracted image data sets, in particular in the absence of an initial classification by way of a classification algorithm. It is conceivable for the initial classification to be carried out by way of a classification algorithm once the plausibility check is complete.

The disclosure further relates to a classification system comprising a first interface may be configured to acquire medical image data, a second interface may be configured to provide verified classified image data sets, and a computing unit (computer). The classification system may be configured to carry out a method according to the disclosure for classifying medical image data.

Necessary functions, algorithms or parameters can be provided to the classification system for carrying out the method according to the disclosure via the first and/or second interface. In particular, the first interface can be configured to provide a plurality of defined phases and/or to provide a trained function and/or a neural network and/or to provide the classification algorithm. The plurality of defined phases and/or a trained function and/or a neural network and/or the classification algorithm can also be stored in a memory unit comprised by the classification system. The verified classified image data sets and/or further results of one embodiment of the method according to the disclosure can be provided via the first and/or second interface. The classification system can be integrated into a medical imaging device may be configured to acquire medical image data. The classification system may also be installed separately from the medical imaging device. The classification system may be connected to the medical imaging device.

Embodiments of the classification system according to the disclosure are configured in a manner similar to the embodiments of the method according to the disclosure. The classification system may have further control components which are necessary and/or advantageous for carrying out a method according to the disclosure. The classification system may also be configured to transmit control signals and/or to receive and/or process control signals, so as to carry out a method according to the disclosure. Computer programs and further software by way of which the processor unit of the classification system automatically controls and/or performs a procedure of a method according to the disclosure may be stored in a memory unit of the classification system.

A computer program product according to the disclosure is directly loadable in a memory unit of a programmable computing unit and has program code means for carrying out a method according to the disclosure when the computer program product is run in the computing unit. As a consequence, the method according to the disclosure can be carried out quickly, identically repeatably and robustly. The computer program product is configured such that it can carry out the method steps according to the disclosure by way of the computing unit. The computing unit must here in each case have the prerequisites such as for example an appropriate working memory, an appropriate graphics card or an appropriate logic unit for it to be possible to carry out the respective method steps efficiently. The computer program product is for example stored on an electronically readable medium or stored on a network or server from which it can be loaded into the processor of a local classification system. Control information for the computer program product may furthermore be stored on an electronically readable data storage medium. The control information of the electronically readable data storage medium may be designed such that, when the data storage medium is used in a computing unit of the classification system, it carries out a method according to the disclosure. Examples of electronically readable data storage media are a DVD, a magnetic tape or a USB stick on which electronically readable control information, in particular software, is stored.

Furthermore, the disclosure relates to an electronically readable data storage medium, on which a program is stored which is provided to carry out a method for classifying medical image data.

The advantages of the classification system according to the disclosure, of the computer program product according to the disclosure and of the electronically readable data storage medium according to the disclosure correspond substantially to the advantages of the method according to the disclosure for classifying medical image data, which have been described in detail above. Features, advantages or alternative embodiments mentioned in this connection are likewise also applicable to the other claimed subjects and vice versa.

FIG. 1 shows a flow diagram of a first embodiment of a method according to the disclosure for classifying medical image data.

The first embodiment provides that the medical image data is acquired, preferably with the assistance of a first interface 3, in method step 110, the medical image data portraying an examination region including a liver of an object under examination. The medical image data comprise at least three image data sets which each image the examination region in each case at a time of capture within a period of less than two hours. Each of the at least three image data sets may include metadata with regard to at least one capture parameter and the respective time of capture of the corresponding image data set.

Method step 120 provides a classification algorithm configured to make an image-based correlation between an image data set and a phase of a plurality of defined phases relative to a time of administration of a contrast agent. In the subsequent method step 130, at least three image data sets are extracted from the medical image data on the basis of the metadata. Method step 140 comprises generating initially classified image data sets by applying the classification algorithm to the at least three extracted image data sets, wherein at least one phase is assigned to each of the three extracted image data sets.

Method step 150 provides a plausibility check of the initially classified image data sets and generation of verified classified image data sets, wherein, in the event of inadequate plausibility, an indication is output and/or the classification of the initially classified image data sets is corrected in method step 151. In the event of confirmed plausibility, the classification of the initially classified image data sets is retained in method step 152.

The verified classified image data sets are provided, preferably with the assistance of a second interface 4, in method step 160. In the event of inadequate plausibility, an indication with regard to possibly incorrectly initially classified image data sets may likewise be output to a user via the second interface.

The plausibility check according to method step 150 may optionally comprise at least one of the following comparisons:

- comparison of the assigned phases with a relative time lag of the times of capture of the initially classified image data sets,
- comparison of an order of the assigned phases with an order of the times of capture of the initially classified image data sets and/or with a defined order of the plurality of defined phases, or
- comparison of the number of the at least three image data sets with the number of mutually differing assigned phases.

Figure 2:
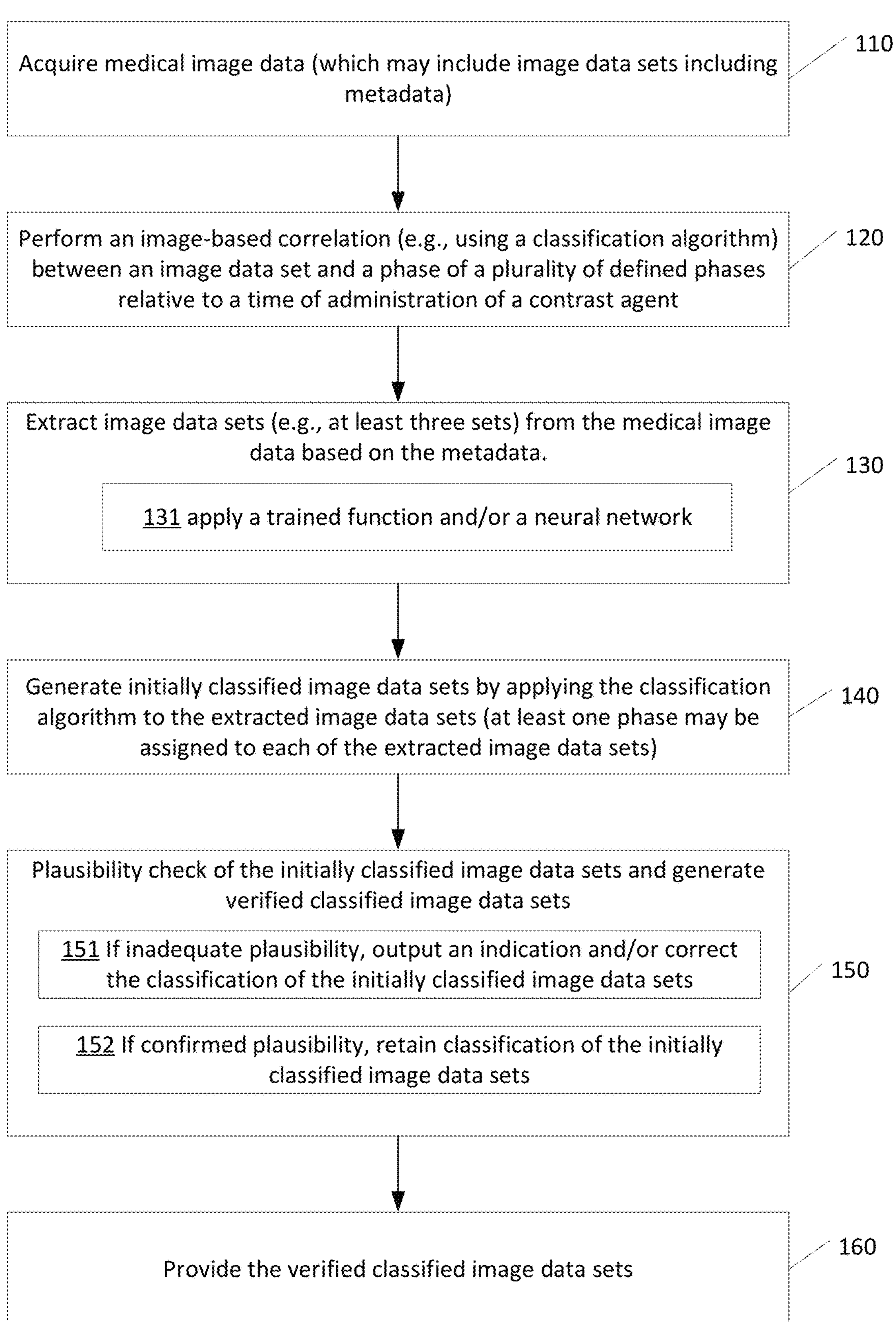
FIG. 2 is a flowchart of a method according to the disclosure.

FIG. 2 shows a flow diagram of a second embodiment of a method according to the disclosure. This second embodiment differs from the first embodiment depicted in FIG. 1 in that method step 130, i.e., extraction of at least three image data sets from the medical image data on the basis of the metadata, may include method step 131 which may include application of a trained function and/or a neural network.

Figure 3:
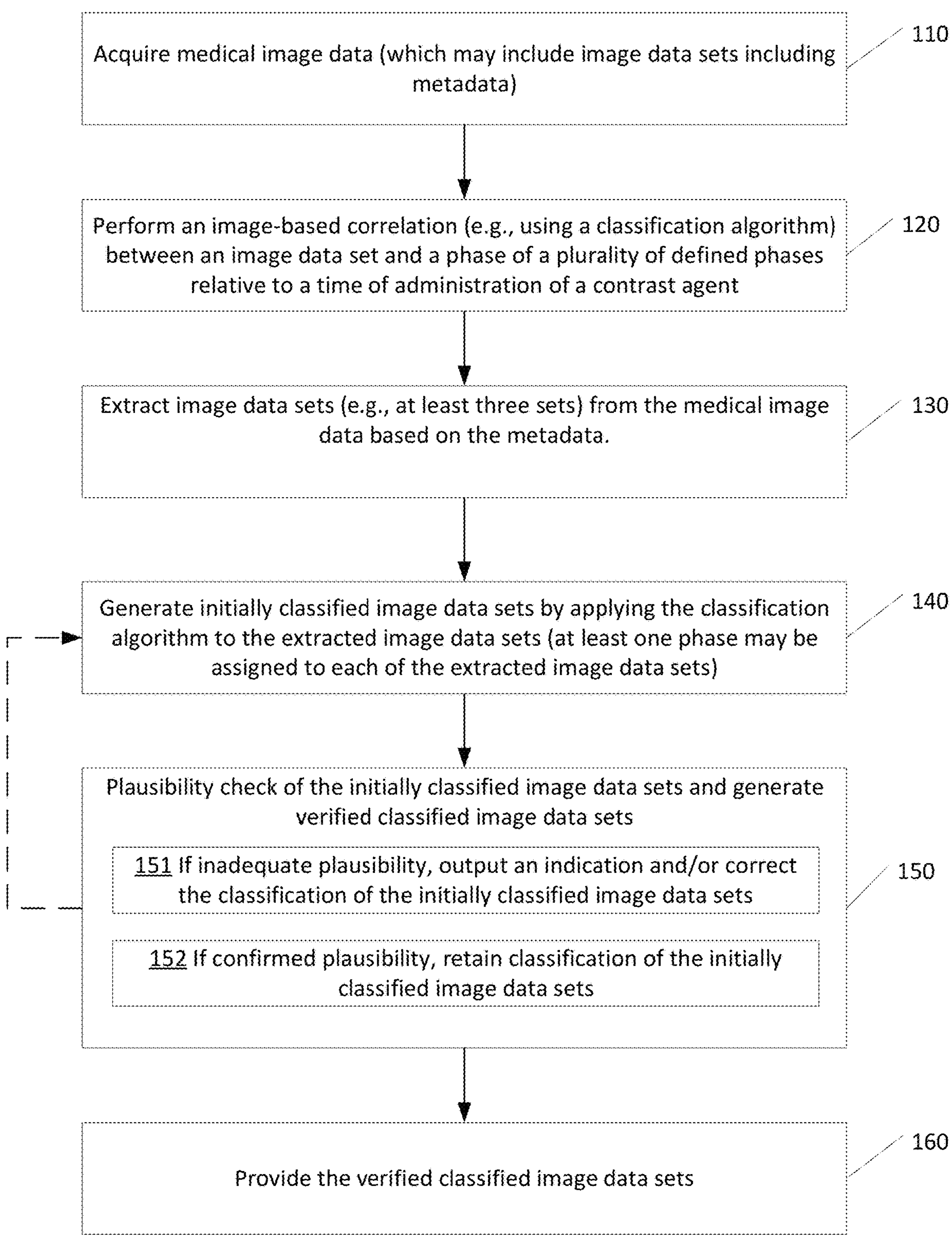
FIG. 3 is a flowchart of a method according to the disclosure.

FIG. 3 shows a flow diagram of a third embodiment of a method according to the disclosure. This third embodiment differs from the first embodiment depicted in FIG. 1 in that, after method step 150, i.e., after the plausibility check, the classification algorithm is applied once again according to method step 140. Method steps 140 and 150 may also be applied repeatedly one after the other. The steps 140 and 150 may be repeated until a specified criteria are satisfied (e.g., until the plausibility check is adequate).

Figure 4:
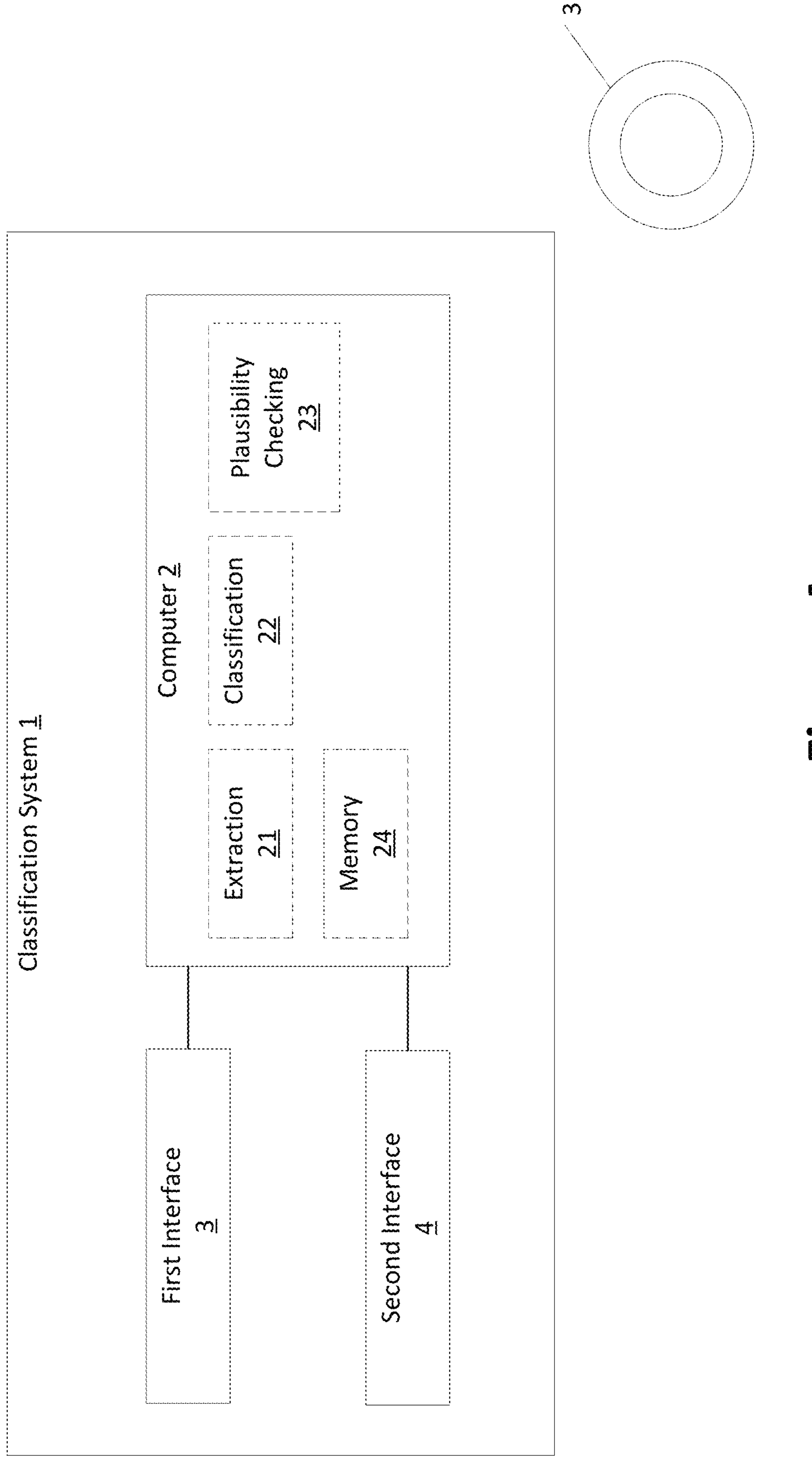
FIG. 4 shows a classification system according to the disclosure.

FIG. 4 is a schematic representation of a classification system 1 according to the disclosure. The classification system 1 may comprise a first interface 3, a second interface 4, and a computer unit (computer) 2. The first interface 3 may be configured to acquire medical image data according to method step 110. The second interface 4 may be configured to provide verified classified image data sets according to method step 160. The computer 2 may be configured to carry out method steps 130, 140 and/or 150. For example, the computer 2 may be configured to extract image data sets from the medical image data based on the metadata, generate initially classified image data sets by applying the classification algorithm to the extracted image data sets, perform a plausibility check of the classified image data sets and generate verified classified image data sets. The classification system 1 (and/or one or more components therein) may include processing circuitry configured to perform one or more functions of the classification system 1 (and/or respective functions of the component(s) therein).

The computer 2 may comprise an extraction unit (also referred to herein as an extractor or extraction circuitry) 21 configured to extract (e.g., at least three) image data sets from the medical image data based on the metadata according to method step 130. The computer 2 may comprise a classification unit (also referred to herein as a classifier or classifying circuitry) 22 configured to generate initially classified image data sets by applying the classification algorithm to the (e.g., at least three) extracted image data sets according to method step 140. The computer 2 may include a plausibility checking unit (also referred to herein a verifier, verification circuitry, plausibility checking circuitry) 23 configured to generate verified classified image data sets by plausibility checking the initially classified image data sets according to method step 150. The classification algorithm may be provided to the computer 2, for example via the first interface 3, according to method step 120. The classification algorithm may be stored in a memory 24 of the computing unit 2 (and/or an external memory) and retrieved on provision according to method step 120.

The classification system 1 together with the computer 2 is thus configured to classify medical image data, i.e., to carry out the method according to the disclosure.

The computer 2 may include computer programs and/or software which is/are directly loadable into a memory unit (e.g., memory 24 and/or an external memory) of the computer 2, with program means for carrying out a method for classifying medical image data when the computer programs and/or software are executed in the computer 2. To this end, the computer 2 may comprise processing circuitry (e.g., a processor) configured to execute the computer programs and/or software to cause the computer 2 perform one or more functions of the computer 2. Alternatively, the computer programs and/or software may also be stored on an electronically readable data storage medium 31 (and/or other external memory) provided separately from the classification system 1 and/or the computer 2, data on the electronically readable data storage medium 31 being accessible from the computer 2 via a data network and/or the first interface 3 and/or the second interface 4.

A method according to the disclosure for classifying medical image data may also be present in the form of a computer program product which implements the method on the computer 2 when it is executed on the computer 2. Likewise, an electronically readable data storage medium 31 with electronically readable control information stored thereon may be present, which control information comprises at least one such computer program product as has just been described and is designed to carry out the described method in a computer 2 of a classification system 1 using the data storage medium 31.

Although the disclosure has been illustrated and described in greater detail with reference to the preferred exemplary embodiments, the disclosure is not restricted by the disclosed examples and other variations may be derived therefrom by a person skilled in the art without going beyond the scope of protection of the disclosure.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have"

and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

The various components described herein may be referred to as "modules," "units," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such modules, units, or devices, as applicable and relevant, may alternatively be referred to herein as "circuitry," "controllers," "processors," or "processing circuitry," or alternatively as noted herein.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

Memory as discussed herein is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The invention claimed is:

1. A method for classifying medical image data, comprising the following method steps:

acquiring medical image data of an examination region including a liver of an object under examination, the medical image data including at least three image data sets, each of which images the examination region in each case at a time of capture within a period of less than two hours, wherein each of the at least three image data sets comprises metadata associated with at least one capture parameter and the time of capture;

providing a classification algorithm configured to make an image-based correlation between an image data set and a phase of a plurality of defined phases relative to a time of administration of a contrast agent;

extracting at least three image data sets from the medical image data based on the metadata;

generating initially classified image data sets by applying the classification algorithm to the at least three extracted image data sets, wherein at least one phase is assigned to each of the three extracted image data sets;

performing a plausibility check on the initially classified image data sets to generate verified classified image data, wherein:

in response to an inadequate plausibility: outputting of an indication of the inadequate plausibility and/or performing a correction of the classification of the initially classified image data sets, and in response to a confirmed plausibility: retaining the classification of the initially classified image data sets; and providing an electronic signal representing the verified classified image data sets.

2. The method as claimed in claim 1, wherein the plausibility checking of the initially classified image data sets is based on:

an order of the assigned phases;

an order of the times of capture;

a relative time lag of the times of capture of the initially classified image data sets;

a number of the at least three image data sets;

a number of mutually differing assigned phases; and/or medical image data metadata.

3. The method as claimed in claim 1, wherein the medical image data comprises computed tomography (CT) data with dynamic contrast enhancement.

4. The method as claimed in claim 1, wherein the medical image data comprises magnetic resonance (MR) data with dynamic contrast enhancement.

5. The method as claimed in claim 4, wherein the capture parameter comprises: echo time, repetition time, magnetic resonance (MR) control sequence, and/or contrast.

6. The method as claimed in claim 4, wherein extracting the at least three image data sets comprises selecting image data sets having a T1 contrast.

7. The method as claimed in claim 1, wherein the plurality of defined phases comprises at least three of the following phases:

native phase comprising a first period prior to administration of a contrast agent, arterial phase comprising a second period beginning between 20 seconds and 40 seconds after administration of the contrast agent, portal venous phase comprising a third period beginning between 75 seconds and 105 seconds after administration of the contrast agent, equilibrium phase comprising a fourth period beginning between 2.5 minutes and 3.5 minutes after administration of the contrast agent, and hepatobiliary phase comprising a fifth period beginning between 17 minutes and 23 minutes after administration of the contrast agent.

8. The method as claimed in claim 1, wherein extracting the least three image data sets comprises applying a trained function and/or a neural network to the medical image data.

9. The method as claimed in claim 1, wherein the classification algorithm comprises an algorithm adapted to identify landmarks.

10. The method as claimed in claim 1, wherein the classification algorithm comprises a trained function configured for machine learning.

11. The method as claimed in claim 1, wherein the classification algorithm comprises a regression model.

12. The method as claimed in claim 1, wherein the plausibility check comprises:

a comparison of the assigned phases with a relative time lag of the times of capture of the initially classified image data sets;

a comparison of an order of the assigned phases with an order of the times of capture of the initially classified image data sets and/or with a defined order of the plurality of defined phases; and/or a comparison of the number of the at least three image data sets with the number of mutually differing assigned phases.

13. The method as claimed in claim 1, wherein the generation of verified classified image data sets comprises a further application of the classification algorithm following completion of the plausibility check.

14. A non-transitory computer-readable storage medium with an executable program stored thereon, that when executed, instructs a processor to perform the method of claim 1.

15. A classification system comprising:

a first interface configured to acquire medical image data of an examination region including a liver of an object under examination, the medical image data including at least three image data sets, each of which images the examination region in each case at a time of capture within a period of less than two hours, wherein each of the at least three image data sets comprises metadata associated with at least one capture parameter and the time of capture;

a second interface; and a computer configured to:

perform, using a classification algorithm, an image-based correlation between an image data set and a phase of a plurality of defined phases relative to a time of administration of a contrast agent;

extract at least three image data sets from the medical image data based on the metadata;

generate initially classified image data sets by applying the classification algorithm to the at least three extracted image data sets, wherein at least one phase is assigned to each of the three extracted image data sets;

perform a plausibility check on the initially classified image data sets to generate verified classified image data, wherein:

in response to an inadequate plausibility: outputting of an indication of the inadequate plausibility and/or performing a correction of the classification of the initially classified image data sets, and in response to a confirmed plausibility: retaining the classification of the initially classified image data sets; and provide, via the second interface, an electronic signal representing the verified classified image data.

16. An apparatus comprising:

one or more processors; and memory storing instructions that, when executed by the one or more processors, cause the apparatus to:

acquire medical image data of an examination region including a liver of an object under examination, the medical image data including at least three image data sets, each of which images the examination region in each case at a time of capture within a period of less than two hours, wherein each of the at least three image data sets comprises metadata associated with at least one capture parameter and the time of capture;

provide a classification algorithm configured to make an image-based correlation between an image data set and a phase of a plurality of defined phases relative to a time of administration of a contrast agent;

extract at least three image data sets from the medical image data based on the metadata;

generate initially classified image data sets by applying the classification algorithm to the at least three extracted image data sets, wherein at least one phase is assigned to each of the three extracted image data sets;

perform a plausibility check on the initially classified image data sets to generate verified classified image data, wherein:

in response to an inadequate plausibility: outputting of an indication of the inadequate plausibility and/or performing a correction of the classification of the initially classified image data sets, and in response to a confirmed plausibility: retaining the classification of the initially classified image data sets; and provide an electronic signal representing the verified classified image data sets.

* * * * *